Patented Mar. 3, 1942

2,274,988

UNITED STATES PATENT OFFICE 2,274,988

PROCESS OF TREATING CATALYSTS

Maryan P. Matuszak, Bartlesville, Okla., assignor to Phillips Petroleum Company, a corporation of Delaware No Drawing. Application April 29, 1938, Serial No. 205,109

22 Claims. (Cl. 260—683)

This invention relates to a process of treating contact catalysts.

More particularly, this invention relates to the treatment of contact catalysts which display an induction period.

Many contact catalysts display at the start of a period of use for effecting chemical reactions a more or less extended induction period during which only an inferior amount of conversion is effected. Thus Green ("Industrial Catalysis," p. 16 (1928)) says, "A period of induction—generally short—during which the catalytic surface is becoming accommodated to its function is characteristic of most contact catalysts." Such induction periods have long been observed. They have been frequently found in connection with, but they are not limited to, catalytic reactions involving hydrogen. For example, Ellis ("Hydrogenation of Organic Substances," third edition, p. 113 (1930)), in discussing the hydrogenation work of the pioneers, Sabatier and his collaborators, says that these investigators state that there is "A short period when the catalyst is becoming 'accustomed' to the atmosphere of hydrogen and the body to be treated."

When such an induction period is short, extending for only a few minutes, it is considered not very troublesome and may be ignored. But when it extends to upwards of an hour or more, it occasions considerable trouble and it is then highly objectionable and disadvantageous. It then demands unprofitable use of the catalyst for a more or less extended period of time and in a continuous or flow process it causes the production of effluents which are not uniform in composition and which because of the low yield must be processed and recycled at additional expense.

Catalysts which when first used display but a short and for practical purposes negligible induction period frequently change with long-continued use, repeated reactivations, or with special treatment which otherwise would be desirable, and develop a more lengthy induction period which cannot be ignored. As far as I am aware no process of treating such catalysts for the purpose of eliminating or minimizing such troublesome and disadvantageous induction period, or of shortening the time required by the catalytic surface to become accommodated to its function, has heretofore been developed or used and in the past catalysts with long induction periods have generally been discarded or reworked by extensive chemical treatment into fresh catalysts, which is attended by considerable inconvenience and expense. This lack of a suitable process of eliminating or minimizing a catalytic induction period is a major defect and disadvantage of the prior art.

Another defect and disadvantage of the prior art relates to catalysts which have deteriorated to the extent that they are no longer capable of effecting efficient or useful conversion for suitably long periods of time although they may still be capable of efficient or useful conversion for a fraction of the usual operating period, such as one-half or more. By operating period is meant a period of use of the catalyst for effecting a catalytic conversion such as hydrogenation, dehydrogenation, hydration, dehydration, polymerization, depolymerization, cracking, oxidation, reduction, or other catalytically promoted chemical reactions for the synthesis or decomposition of chemical compounds. After such a period of use the catalyst is ordinarily reactivated, revivified, or regenerated before it can be used in the succeeding operating period. The duration of an operating period may generally be determined by factors quite extraneous to the activity of the catalyst, such as definite or prearranged hours for shifting of labor crews, availability of additional catalyst supplies, and similar factors which are familiar to those skilled in the art. Under these circumstances, the prior art has had no recourse except to continue an undesirably low conversion, or to interrupt the operations for the purpose of reactivating the catalyst, or to increase the reaction or operating temperature of the catalyst, or to increase the time of contact between catalyst and reactant material. All of these actions under certain conditions are definitely disadvantageous or inconvenient and often involve costly disturbance of the operating schedule and of the most desirable balancing among the interrelated unit processes which, together with the catalytic conversion process itself, make up the ensemble of plant operations.

One of the objects of this invention is to provide a means of effectively eliminating or minimizing the more or less extended induction period characteristic of many contact catalysts.

Another object is to effect treatment, or more specifically, a dynamization of contact catalysts which are characterized by a more or less extended induction period, whereby such catalysts are caused to display a high catalytic activity at the beginning of a period of use instead of after the more or less extended induction period.

A further object is to provide a means for increasing the activity of contact catalysts in the midst of a period of use without recourse to relatively undesirable operations such as time-consuming reactivation or the use of objectionable or disadvantageous operating conditions.

Other objects and advantages of this invention will be apparent from the following description and examples.

It will be understood that by the word catalyst is meant herein a contact material which is in condition for effecting a catalytic conversion and which does not require a preliminary decomposition, reduction, or other treatment that effects a chemical change in the material. For example, in the case of catalysts consisting of or comprising one or more metals or lower oxides of metals or metalloids, which catalysts are generally prepared by reduction of oxides, and/or salts, it will be assumed hereinafter that the said reduction has been effected. Before use, such catalysts are generally kept out of contact with deleterious materials that may poison the catalyst or effect an undesired chemical change in the catalyst. This is generally accomplished by keeping the catalyst in a protecting fluid atmosphere containing or comprising one or more gases or liquids that do not react irreversibly with the catalyst. Gases or liquids that do react irreversibly with the catalyst are generally excluded from such protecting atmosphere. Frequently used and usually suitable gases are hydrogen, nitrogen, carbon dioxide and the like; but it will be understood that the choice of a suitable gas may vary with different catalysts and that a gas suitable for a particular catalyst may be unsuited for some other particular catalyst. However, a suitable choice may be readily determined by trial.

I have found that heating a catalyst, prior to or during a period of use and in the effective absence of materials that react irreversibly with the catalyst, to a dynamizing temperature higher than the operating temperature at which it is to be subsequently used for effecting a catalytic conversion, produces a mobile state or condition in the catalyst whereby the catalyst, on being cooled to the operating or conversion temperature as hereinafter more fully detailed, becomes capable of effecting at once a greater conversion than it could immediately effect if heated initially only to the operating temperature.

This mobile state or condition will hereinafter be termed a state of dynamization. This dynamization is novel and as far as I am aware, it is totally and completely unknown in the prior art. In the practice of the prior art, the catalyst has been generally heated only to the operating temperature immediately prior to or during a period of use, and it has not been heated above the operating temperature and then cooled to the operating temperature under the controlled and special conditions herein described, since such a procedure on prima facie grounds has generally been considered to be unnecessary, undesirable, and a wasteful use of time, energy, labor and equipment. Hence my invention, in spite of its apparent simplicity, is a startling and unexpected advance over the prior art.

The precise nature of the state of dynamization is not at present completely understood. Nevertheless, my process of effecting such a state of dynamization is highly useful and is especially so for the elimination or minimization of the induction period hereinbefore described.

In order to establish a clear understanding of various possible procedures of practicing my invention and of advantageous conditions for its utilization, it is desirable to mention certain properties or characteristics of the state of dynamization effected by it. However, any statements of a theoretical nature made herein for the purpose of aiding an explanation or illustration of the mode of operation of this invention are not to be construed as limitations thereof. The state of dynamization is mobile, by which I mean that it is a transitory and not a permanent condition of the catalyst in the sense that it does not persist indefinitely or from one period of use to another period of use or through an intervening period of reactivation, revivification, or regeneration of the catalyst.

The state of dynamization appears to be influenced by the atmosphere surrounding the catalyst, such as the protecting fluid atmosphere hereinbefore mentioned, especially at temperatures below the dynamizing temperature. If the atmosphere is a chemically non-reactive atmosphere, that is, if it is a high vacuum as represented by an absolute pressure of about 0.1 mm. of mercury or less or if it consists of one or more of the rare or null-valent gases of the zero group of the periodic table, such as helium, neon, or argon, the state of dynamization apparently persists practically indefinitely or as long as such atmosphere is maintained, regardless of the temperature of the catalyst. Hence, provided that such an atmosphere surrounds the catalyst, the catalyst may be cooled from the dynamizing temperature to the operating temperature at any rate that is convenient or desired, fast or slow, insofar as persistence of the state of dynamization is concerned, and then the catalyst may be used for effecting a catalytic conversion. Likewise, if for any reason the catalyst must be cooled below the operating temperature or if it must be kept at the operating temperature for a more or less extended period of time without being used for effecting a conversion, the state of dynamization effected by the practice of this invention may be maintained virtually indefinitely if a such chemically non-reactive atmosphere consisting of a vacuum or of one or more of the rare or null-valent gases continuously surrounds the catalyst.

On the other hand, if the atmosphere surrounding the catalyst comprises chiefly one or more fluids that are generally chemically reactive but in particular are inert with respect to the catalyst, the state of dynamization appears to be transitory and it does not persist indefinitely when the catalyst is cooled below the dynamizing temperature and is then kept for a more or less extended period of time at a temperature appreciably below the dynamizing temperature. By a fluid chemically reactive but inert with respect to the catalyst is meant a fluid which, in contradistinction to a rare or null-valent gas, is capable of taking part in well-known chemical reactions but which does not react irreversibly with the catalyst under the conditions of operation of my invention as more fully elsewhere herein indicated. Generally suitable fluids for most catalysts are gases such as hydrogen, nitrogen, carbon dioxide, carbon monoxide, steam, flue gas freed from free oxygen, and the like. If in a particular case one or more of the gases mentioned is found not to be highly suitable for use as a surrounding atmosphere, a more suitable gas may be readily found by trial. For example, in the case of catalysts containing oxides capable of being reduced by hydrogen, this gas would not be suitable; but in such case, nitrogen would probably be highly suitable. Free oxygen is an example of a fluid which in many cases is undesirable for the present purpose, as it appears to combine irreversibly with the catalysts and thus to overcome partly or totally the advantages attendant upon the practice of my invention. However, in many other cases, in which the catalysts do not react irreversibly with free oxygen, such as catalysts consisting of oxides incapable of further oxidation, free oxygen may comprise part or all of the surrounding atmosphere. Even in the case of catalysts that do react irreversibly with oxygen small concentrations of free oxygen as an impurity may be tolerated, provided that there is present in excess a suitable reducing gas such as hydrogen or carbon monoxide that will remove the oxygen by reacting with it and provided further that such reducing gas and the product formed do not react irreversibly with the catalyst under the conditions of operation of this invention.

Due to the transitory character of the state of dynamization of the catalyst in the presence of a chemically reactive but inert-to-catalyst atmosphere, the cooling of the catalyst from the dynamizing temperature to the operating temperature and the period of time that the catalyst is maintained at the operating temperature before conversion is begun should not be too prolonged. Too slow a rate of cooling or too long a period of time during which the catalyst is subsequently kept in such an atmosphere apparently permits a gradual dissipation of the state of dynamization with consequent partial or complete loss of the benefits of this invention. But if the cooling is carried out rapidly, or suddenly and quickly so that it approaches in nature a shock-chilling of the catalyst or an almost instantaneous change from a relatively high temperature to a relatively low temperature, the induction period hereinbefore described is eliminated more or less completely, provided that establishment of the presence of the fluid to be catalytically converted with the aid of the catalyst is not too long delayed.

I wish to point out specifically that such elimination of the induction period is not due to the existence of a higher-than-operating temperature in the catalyst at the beginning of the conversion period, for I have carefully measured the temperature of the catalyst to ensure that it was the operating or conversion temperature desired and not some intermediate temperature between the desired conversion temperature and that at which the catalyst had been previously heated for dynamization.

If for any reason it is not feasible or convenient to effect sufficiently rapidly the cooling of the dynamized catalyst or the establishment of the presence of the fluid to be converted, I may make use of a vacuum or of a null-valent gas such as helium as the atmosphere surrounding the catalyst. A vacuum may often be preferable to helium in that it may be established at less expense. More than one atmosphere may be used, as for example, carbon dioxide during the heating to the dynamizing temperature and a vacuum thereafter.

Of the various atmospheres that are chemically reactive but inert to the catalyst, certain ones may be preferable or advantageous in comparison with others. Thus, in the case of catalysts prepared by reduction of oxides, hydrogen may be the most preferable atmosphere, then nitrogen, and so on more or less in the order they have been mentioned hereinbefore. Hydrogen may be most preferable because it ensures that the catalyst remains in a reduced condition in case small leaks are present in the equipment housing the catalyst. Nitrogen in such cases is generally more advantageous than the oxides of carbon and steam because it appears to be less strongly adsorbed by most catalysts of this type.

In addition to effecting a decrease or elimination of an induction period as hereinbefore described, my invention may be used to effect a lengthening of a conversion period when the catalyst used has become deactivated to the extent that the desired rate of conversion is not being maintained. In such case the reactant is removed and the catalyst is subjected to the dynamization process of my invention. In many instances, it is advantageous to use hydrogen as the surrounding atmosphere since it may have a desirable effect in aiding a removal of adsorbed poisons, such as a removal of sulfur by the formation of hydrogen sulfide.

Used in this way, my dynamization process is of practical value when in the midst of an operating period it is found that the catalyst is not causing sufficient conversion to make its continued use profitable or desirable, due to some cause such as a partial permanent deterioration of the catalyst, or a temporary poisoning of the catalyst, or an excessive deposition of carbonaceous or other matter because of an unfavorable composition of the reactant feed stock, or the like, and it is desired nonetheless to continue operating with the catalyst for a further more or less extended period of time. The dynamization process may be used regularly to extend the usual operating or conversion period but it may be of greatest usefulness as an emergency or reserve procedure under circumstances that make it undesirable to stop operating the catalytic conversion process at the moment to reactivate the catalyst, as for example, when the length of each operating period is determined not by the state of activity of the catalyst but by extraneous circumstances such as definite or predetermined hours of shifting of labor crews, availability of additional catalyst supplies, and the like.

The process of dynamization of this invention should not be confused with the radically different process of reactivation, revivification, or regeneration mentioned occasionally herein. In the latter process, the catalyst is treated with a chemically reactive fluid for the purpose of removing by chemical reaction any carbonaceous or other matter deposited on the catalyst during a preceding period of use in a catalytic conversion process. During such reactivation the catalyst itself usually undergoes a chemical reaction with the reactivating fluid and must be chemically restored before being used again. The reactivation must generally be conducted at a much lower temperature than the dynamizing temperature of this invention. It is also generally much more time-consuming than the present dynamization process.

Likewise, the dynamizing process of this invention should not be confused with other and old processes wherein chemical and/or physical changes are produced in catalytic contact masses. For example, dynamization is not in any sense an activation of a contact mass whereby a chemical change such as a dehydration, a reduction, an oxidation, or in general any definite chemical reaction is effected within the contact mass to render it catalytically active or to increase any previously held degree of catalytic activity. Nor does it comprise any procedure of activation in which a chemical substance or substances such as substances commonly called promoters or activators or accelerators are added to the catalyst for the purpose of changing the catalytic or adsorptive properties of the surface thereof. Similarly, it is not an activation comprising a readily recognizable or measurable physical change such as a change in porosity, or in physical structure, or in state of subdivision, or in state of agglomeration, or the like. Such old chemical and/or physical changes, in contradistinction to the transitory dynamical change produced by dynamization, are permanent and do not disappear in the presence of gases that are in general chemically reactive but which in particular are inert to the catalyst in the sense that they do not react irreversibly with the catalyst.

It is clear from the foregoing general description that my invention is broadly applicable to a large number of solid or contact catalysts. Catalysts free from an induction period under the conditions of operation of the prior art are naturally excluded from the province of this invention insofar as its use for elimination or reduction of induction period is concerned. The invention is not to be limited to any particular composition of catalyst, nor to any particular reactions aided or effected by the catalysts, nor to any particular operating conditions of temperature and the like, except as set forth in the appended claims. No useful purpose would be accomplished by enumeration of the multitude of now known catalysts that may be dynamized by the process of this invention. Hence, in the interest of brevity and not by way of limiting my invention, the following purely illustrative specific examples of its mode of operation are limited to catalysts containing black unglowed chromium oxide. As a reaction for demonstrating the activity of the catalysts, I have selected the conversion of isobutane into isobutylene by dehydrogenation, without, however, limiting my invention thereto, for chromium oxide catalysts may be used for promoting hydrogenation, desulfurization and other reactions.

*Example I.*—A sample of chromium oxide-containing catalyst was repeatedly used for the conversion of isobutane to isobutylene and repeatedly reactivated. After such repeated use, this sample normally had an induction period of 12 hours; that is, when the catalyst was heated to 450° C. in an atmosphere of hydrogen, and then isobutane was passed over the catalyst at a pressure of one atmosphere and at a flow rate of 2.5 liters per hour per cubic centimeter of catalyst, it required 12 hours for the conversion to increase from an initial value of about 3 per cent to the equilibrium value of about 17 per cent. After a run with such an induction period was completed the catalyst was reactivated by burning off with air the carbonaceous matter deposited thereon and it was then heated in a current of hydrogen to 600° C. After about half an hour at 600° C. it was suddenly and quickly transferred from the furnace at 600° C. to another furnace kept at the operating temperature of 450° C., whereby the catalyst was almost instantaneously cooled to 450° C. When it had been ascertained with an iron-constantan thermocouple that the temperature of the catalyst was truly 450° C. and not some intermediate temperature between 450 and 600° C., the flow of isobutane, at atmospheric pressure and at 2.5 liters per hour per cubic centimeter of catalyst, was established in place of the current of hydrogen. The conversion of isobutane to isobutylene reached the equilibrium value of 17 per cent within a few minutes, in startlingly sharp contrast to the period of 12 hours required in preceding runs that had been made without prior dynamization of the catalyst by the process of this invention.

*Example II.*—In the next run made with the sample of catalyst used in Example I, the catalyst was brought from a temperature of 600° C. to 450° C. in the manner described in Example I but a period of 15 minutes was then allowed to elapse, with the catalyst kept in hydrogen at 450° C., before the flow of isobutane was established. In this run there was an induction period of about 5 hours, during which the conversion increased from an initial value of about 12 per cent to the equilibrium value of 17 per cent. This result indicated that the state of dynamization brought about by subjecting the catalyst to the dynamizing temperature of 600° C. was not permanent in the presence of hydrogen at the lower temperature of 450° C. but was of a transitory nature. Since, however, in an interval as long as 15 minutes the induction period became restored only to the extent of 5 hours, or to less than half of its value of 12 hours that was characteristic of the catalyst when not subjected to the dynamizing procedure of my invention, it is clear that my invention effected a very worthwhile improvement in the performance of the catalyst.

*Example III.*—A chromium oxide catalyst normally exhibiting an induction period of 12 hours for the conversion of isobutane to isobutylene at 450° C. was heated in an atmosphere of hydrogen to a temperature of about 625° C. Then the hydrogen was replaced by a high vacuum of the order of 0.1 mm. of mercury absolute pressure, produced by an efficient oil pump and the catalyst was allowed to cool in the high vacuum to 450° C. during a period of about an hour. The catalyst was kept in the high vacuum at 450° C. for half an hour. Then the conversion run was started by replacing the high vacuum by isobutane at atmospheric pressure and flowing at the rate of 2.5 liters per hour per cubic centimeter of catalyst. The catalyst exhibited no induction period at all in this run, equilibrium conversion taking place at once.

*Example IV.*—When the run described in Example III was completed, the catalyst, after reactivation, was heated in hydrogen to 450° C. and then in oxygen-free nitrogen to about 625° C. It was kept in nitrogen at this dynamizing temperature for an hour; then the nitrogen was replaced by a vacuum and the temperature was decreased to 450° C. in the course of another hour. The catalyst was kept in the vacuum at 450° C. for almost an hour. Then conversion was begun by replacing the vacuum by isobutane under the conditions described in the preceding examples. The induction period was completely eliminated. In a similar trial in which the same gases, temperatures, and periods of time were used but in which the cooling of the catalyst to the operating temperature of 450° C. and subsequent pre-conversion keeping of the catalyst at 450° C. was done in nitrogen, the catalyst displayed an induction period of a duration of about 12 hours.

*Example V.*—A chromium oxide catalyst normally exhibiting an induction period of 12 hours for the conversion of isobutane to isobutylene at 450° C. was heated in hydrogen to a temperature of 505—525° C. After about 2 hours of this temperature, the hydrogen was replaced by a vacuum. After 2 hours in a vacuum at 505—525° C., the catalyst was cooled to 450° C. and a conversion run was started by replacing the vacuum with isobutane at atmospheric pressure and flowing at the rate of 2.5 liters per hour per cubic centimeter of catalyst. The induction period in this run was decreased to 5 hours. In a similar trial differing only in that a temperature of 450° C. was used throughout, the induction period was almost 12 hours. These data show that the simple use of an ordinary vacuum for 2 hours at the operating temperature was relatively inefficient and that the simultaneous use of a vacuum and a dynamizing temperature even only 55—75° C. higher than the operating temperature produced a substantial improvement with respect to decreasing the duration of the induction period.

*Example VI.*—When a chromium oxide catalyst normally having an induction period of 7 hours for the conversion of isobutane to isobutylene at 450° C. was heated in hydrogen to 650° C. and then was suddenly chilled to the operating temperature of 450° C. two or three minutes before replacing the hydrogen with isobutane at the beginning of a conversion run, the induction period was completely eliminated.

*Example VII.*—A chromium oxide catalyst normally having an induction period of 14 hours, for the conversion of isobutane into isobutylene when heated to the operating temperature of 450° C. in hydrogen, was heated to 450° C. in hydrogen, was kept in hydrogen at 450° C. for almost an hour and then was heated to 630° C. in an atmosphere of carbon dioxide. After half an hour at 630° C., the carbon dioxide atmosphere was replaced by a high vacuum and the temperature was allowed to decrease to 450° C. in about an hour. After the catalyst had been kept in a vacuum at 450° C. for about half an hour, the conversion run was begun by establishing a flow of isobutane at atmospheric pressure and at a rate of 2.5 liters per cubic centimeter of catalyst per hour. The induction period in this run had a duration of about 6 hours. Since in similar runs in which hydrogen or nitrogen was used the induction period was completely eliminated, this example showed that, for the particular catalyst concerned, carbon dioxide was inferior to hydrogen or nitrogen as a surrounding atmosphere. In spite of this fact, however, the practice of my invention decreased the induction period to less than half of its normal duration.

*Example VIII.*—The sample of chromium oxide gel catalyst used in Examples I and II was used. Due to intervening long-continued use and to abuse during experimental work, this sample had deteriorated to the extent that it was no longer capable of causing equilibrium conversion of 17 per cent of isobutane to isobutylene under the conditions used in the preceding examples but only a maximum conversion of 15.8 per cent. Without prior dynamization of the catalyst by the process of this invention, the maximum conversion was reached only after a period of 18 hours, which indicated a very long induction period, and the conversion then decreased from the maximum of 15.8 per cent to 13.5 per cent in 8 hours. The stream of isobutane was replaced by one of hydrogen and the catalyst and its container were placed in a furnace kept at 600° C. After being at this temperature for 37 minutes, it was returned suddenly and quickly to the furnace at 450° C. and the flow of isobutane was re-established. Conversion of 15.8 per cent—the maximum possible at 450° C. for the sample of catalyst in its deteriorated condition—was at once obtained. After maintaining this value for 2.5 hours it gradually decreased to 13.5 per cent in 5 more hours. Thus the period of useful conversion was extended by about 7.5 hours. A second similar dynamization in hydrogen at 600° C. for 45 minutes had a smaller beneficial effect, for the maximum conversion thereafter was only 14 per cent and it decreased to 13.7 per cent in 2 hours. Then a third dynamization was similarly made but the temperature of 600° C. was maintained for 3 hours. In consequence of this longer period, the conversion of isobutane to isobutylene became 15.5 per cent, which was maintained for about 1 hour, and then it decreased to 13.5 per cent in 3 more hours. It appears that repeated dynamization of the catalyst by my invention during one operating period, without intervening reactivations, is subject to the law of diminishing returns and that more than one or two such dynamizations during any one operating period would not be generally desirable. Nevertheless, as an emergency or reserve procedure, the practice of this phase of my invention is unquestionably of considerable practical usefulness and value.

The foregoing specific examples have been given for purposes of illustration only and not as in any way limiting the scope of my invention. Taken in conjunction with the more general description that preceded them herein, they furnish a clear understanding of the mode of operation of my invention and indicate its manifold variations and modifications that will be obvious to those skilled in the art. Such variations and modifications are clearly within the scope of my invention insofar as they include the gist of my invention, which is the heating of a catalyst to a dynamizing temperature higher than the operating temperature at which it is to be used for effecting a catalytic conversion, whereby a state of dynamization is established in the catalyst, and then cooling the thus dynamized catalyst to the operating temperature under such conditions of surrounding atmosphere and rate of cooling that the state of dynamization is substantially maintained and is prevented from disappearing before the catalytic conversion is begun.

The operating temperature of most processes using contact catalysts subject to dynamization by the process of my invention will generally be within the range 0–700° C. For any particular catalyst the operating temperature will generally be within a more narrow range than this. For example, in the case of the chromium oxide-containing catalysts of the foregoing specific illustrative examples the useful operating range is about 200–600° C. However, in the case of exceptional catalysts, the operating temperature may be below 0° C. or above 700° C.; hence the operating temperatures herein mentioned should not be construed as limiting the scope of my invention, except as specified in the appended claims.

The dynamizing temperature may vary with the composition of the catalyst, with the composition of the surrounding atmosphere, and, in certain instances, with the reaction for which the catalyst is to be used. In general, a suitable dynamizing temperature may be found within a range of about 50–300° C. above the operating temperature at which the catalyst is to be used for effecting a catalytic conversion. The following dynamizing temperature ranges are given as illustrative of cases involving catalysts other than those mentioned in the foregoing specific examples:

| Catalyst | Atmosphere | Temperature |
|---|---|---|
| | | °C. |
| Palladium | Carbon monoxide | 100–300 |
| Copper | Hydrogen | 200–350 |
| Zinc oxide | do | 300–500 |
| Nickel | do | 150–400 |
| Manganous-chromic oxide | do | 400–700 |
| Do | Carbon monoxide | 450–700 |
| Zinc-molybdenum oxide | Hydrogen | 400–600 |
| Do | Carbon monoxide | 400–600 |
| Zinc-chromic oxide | Hydrogen | 350–650 |
| Alumina | Steam | 500–700 |
| Iron | Hydrogen | 250–600 |
| Molybdenum oxide-silica | do | 500–700 |
| Platinum | do | 300–500 |
| Do | Carbon monoxide | 400–600 |
| Bauxite | Hydrogen | 600–800 |

The choice of a suitable dynamizing temperature, like the choice of a suitable surrounding atmosphere, which has been discussed hereinbefore, sometimes depends strongly on the properties of the individual catalyst. Some catalytic preparations are unable to survive too high a dynamizing temperature on account of a deleterious sintering of the catalytic surface. In such cases, a suitable dynamizing temperature may be readily found by trial. In the case of catalysts that are very sensitive to sintering, a minimum dynamizing temperature may be best obtained in conjunction with the use of a non-reactive surrounding atmosphere, such as a high vacuum or a null-valent gas, for such an atmosphere appears to accelerate or to promote the dynamization process and to preserve the state of dynamization when the catalyst is cooled from the dynamizing temperature.

The period of time that the catalyst is maintained at the dynamizing temperature is not critical if the dynamizing temperature chosen is high enough. In general, it may extend from 1 minute or less to 1 hour or more; a suitable period may be readily determined by trial. It is believed that the catalyst does not reach the maximum state of dynamization possible at any particular dynamizing temperature instantaneously, but only after a somewhat more or less extended period of time during which the dynamization of the catalyst increases in magnitude. However, it is usually not necessary to obtain a maximum state of dynamization and if one temperature does not serve to cause sufficient dynamization within a reasonably short period of time a higher temperature should be chosen. In this connection, the use of a non-reactive surrounding atmosphere, such as a high vacuum, is beneficial and hence is preferred, for reasons that have been indicated hereinbefore.

It is desirable, in the elimination or reduction of an induction period by the practice of this invention, when the catalyst is kept in a chemically reactive but inert-to-catalyst surrounding atmosphere, to make the time intervening between the cooling to the desired operating temperature and the beginning of the flow of reactant molecules over the catalyst as short as possible in order that the induction period may be prevented from being restored to any appreciable extent. Generally, an intervening period of more than about 15 minutes should be avoided. But I do not wish to confine my invention to narrow limits of time, for the permissible duration of the intervening period depends upon the particular surrounding atmosphere used, upon the particular catalyst in question, and probably upon the magnitude of the dynamization that is necessary. The last, in turn, may depend on the normal duration of the induction period, for in the reduction of long induction periods it may be necessary to heat the catalyst to a higher dynamizing temperature, or for a longer period of time at a particular dynamizing temperature, than for the reduction of relatively short induction periods.

Although in some of the foregoing illustrative examples I have carried out the dynamization of the catalyst by heating to the dynamizing temperature in a furnace other than that used for the catalytic conversion, in order to be able to cool the catalyst suddenly and quickly to the operating temperature, I do not wish to limit my invention to the use of a separate dynamizing furnace. It will be obvious to those skilled in the art that one and the same furnace may be used for both dynamization and conversion operations, not only when a non-reactive atmosphere surrounds the catalyst during and/or after the dynamization but also when a reactive inert-to-catalyst surrounding atmosphere is used, provided that in the latter case means are used for effecting rapid or sudden and quick changes in the temperature of the catalyst. This may be accomplished, for instance, by the use of electrical induction, such as high-frequency induction, which permits the influx of energy to the catalyst chamber, which must be made of a suitable metal, to be changed abruptly at will. Similarly, if the catalyst chamber is being heated by means of a heated fluid, the said fluid may be underheated or superheated to effect any desired change in the temperature of the catalyst. By heat transfer through the walls of the catalyst container, by internally disposed heating and cooling means within the body of the catalyst, and by other obvious expedients, temperature changes in either direction may be rapidly effected.

By the practice of this invention I have overcome the hereinbefore described defects and disadvantages of the prior art. My invention has provided a means of effectively eliminating or minimizing the more or less extended induction period characteristic of many contact catalysts. It has effected a dynamization of contact catalysts which are ordinarily characterized by a more or less extended induction period, whereby such catalysts have been caused to display their maximum catalytic activity at the beginning of a period of use instead of after the more or less extended induction period. It has provided a means for increasing the activity of contact catalysts in the midst of a period of use without recourse to relatively undesirable operations or operating conditions.

By the term "dynamization," as used in the appended claims, is meant the state above described, which for the purpose of conciseness may be stated to be a mobile state produced in a contact catalyst which normally displays an induction period prior to each period of use and which is evidenced by a reduced or complete lack of said induction period in said catalyst.

I do not wish to exclude from my invention certain modifications or alternatives which will be obvious to those skilled in the art. Nor do I wish to limit this invention to the details of materials, temperatures, times, reactions and the like which are given in the hereinbefore cited illustrative examples. Furthermore, I do not wish to have my invention limited by any more or less theoretical statements given hereinbefore to account for its mode of operation. Hence, I desire to have it understood that, within the scope of the appended claims, my invention is as extensive in scope and equivalents as the prior art allows.

I claim:

1. A process of treating a contact catalyst capable of promoting a catalytic reaction at an operating temperature substantially below 800° C. and which displays an induction period at the beginning of each period of use for promoting said catalytic reaction, said catalyst being otherwise ready for use in said catalytic reaction, which comprises heating said catalyst prior to each such period of use in an atmosphere inert thereto, to a temperature sufficiently above said operating temperature to produce a state of dynamization therein but below the temperature at which excessive deterioration thereof occurs, and bringing the thus heated catalyst to said operating temperature under such conditions of atmosphere and rate of cooling that said state of dynamization is substantially maintained.

2. A process for reducing the induction period displayed by a contact catalyst having an induction period at the beginning of each period of use for promoting a catalytic reaction at a selected operating temperature said catalyst being otherwise ready for use in said catalytic reaction, which comprises heating said catalyst prior to each such period of use in an atmosphere inert thereto, to an elevated temperature at least 50° C. above said operating temperature but below the temperature at which deterioration of the catalyst occurs at an excessive rate, maintaining said catalyst at said elevated temperature for a time sufficient to establish a state of dynamization in said catalyst, and cooling said catalyst while in said atmosphere, immediately prior to the placing of the catalyst into use for promoting said reaction, to said operating temperature sufficiently rapidly to maintain said state of dynamization.

3. A process of treating a contact catalyst capable of promoting a catalytic reaction under selected operating conditions and which displays an undesirably long induction period at the beginning of each period of use for promoting said reaction, said catalyst being otherwise ready for use in said catalytic reaction, which comprises heating said catalyst prior to each such period of use in an atmosphere inert thereto, to a temperature at least 50° C. above said operating temperature but below the temperature at which deterioration thereof occurs at an excessive rate, and thereafter bringing the thus heated catalyst to said operating conditions within the time during which the catalyst is capable of displaying an induction period substantially shorter than said undesirably long induction period.

4. A process of treating black unglowed chromium oxide catalysts capable of promoting a catalytic conversion at an operating temperature below about 600° C., said catalyst being ready for use in the conversion reaction except for the fact that it displays an undesirably long induction period in the beginning of each period of use which comprises heating said catalyst in an atmosphere inert thereto, to an elevated temperature at least 50° C. above said operating temperature but below the temperature at which excessive deterioration of the catalyst occurs, maintaining said catalyst at said elevated temperature for a time sufficient to establish a state of dynamization in said catalyst, and bringing said catalyst to said operating temperature in a manner such that said state of dynamization is substantially maintained.

5. A process of treating a catalyst comprising black unglowed chromium oxide and which displays an undesirably long induction period at the beginning of a period of use for promoting a catalytic reaction said catalyst being otherwise ready for use in said catalytic reaction which comprises heating said catalyst prior to each period of use in an atmosphere inert thereto, to a temperature at least 50° C. above said operating temperature but below the temperature at which excessive deterioration thereof occurs, and bringing said heated catalyst to the said conditions of use in a manner such that the catalyst is capable of displaying an induction period substantially shorter than said undesirably long induction period.

6. In a process which comprises effecting a change in the carbon-to-hydrogen ratio of a hydrocarbon at a selected operating temperature with the aid of a catalyst comprising black unglowed chromium oxide that displays an undesirably long induction period at the beginning of a period of use for effecting said change, said catalyst being otherwise ready for use for effecting said change, the improvement which comprises heating said catalyst, in an atmosphere inert thereto, to a temperature at least 50° C. above said operating temperature but below the temperature at which excessive deterioration of the catalyst occurs, and thereafter bringing said catalyst to said operating temperature and placing it into use for effecting said change within the time during which the catalyst is capable of displaying an induction period substantially shorter than said undesirably long induction period.

7. A process of treating a contact catalyst capable of promoting dehydrogenation of hydrocarbon material under dehydrogenation conditions and which displays an undesirably long induction period at the beginning of each period of use for promoting said dehydrogenation, said catalyst being otherwise ready for use in said catalytic reaction, which comprises heating said catalyst in an atmosphere inert thereto, to a temperature at least 50° C. above said dehydrogenation temperature but below the temperature at which the catalyst deteriorates at an excessive rate, and thereafter bringing said heated catalyst to said dehydrogenation conditions under such conditions of atmosphere and rate of cooling that the catalyst is capable of displaying an induction period substantially shorter than said undesirably long induction period.

8. In a catalytic process which comprises treatment of hydrocarbon material at an operating temperature within the range of 200 to 600° C. in the presence of a catalyst comprising black unglowed chromium oxide that displays an undesirably long induction period prior to each period of use, said catalyst being otherwise ready for use in said treatment, the improvement which comprises heating said catalyst, in an atmosphere comprising chiefly at least one gas selected from the group consisting of hydrogen and nitrogen, to a temperature at least 50° C. above said operating temperature but below about 650° C., for a period within the range of about 1 to 60 minutes, cooling said catalyst while in said atmosphere to the operating temperature within a period of about 15 minutes, and immediately thereafter replacing said atmosphere by the hydrocarbon material to be treated.

9. The process according to claim 1, in which the atmosphere has a pressure of less than about 0.1 mm. of mercury.

10. The process according to claim 1, in which the atmosphere consists chiefly of at least one rare-gas element.

11. A process of treating a contact catalyst which displays an induction period at the beginning of each period of use for promoting a catalytic reaction at a selected reaction temperature which comprises heating said catalyst in an atmosphere inert thereto, to a temperature substantially higher than said reaction temperature but lower than the temperature at which deterioration thereof occurs at an excessive rate, evacuating said atmosphere to a pressure of less than about 0.1 mm. of mercury, and maintaining said catalyst in said evacuated atmosphere substantially to the moment at which the catalyst is placed into use for promoting said reaction.

12. A process of treating catalysts, which comprises heating a contact catalyst which displays an induction period at the beginning of each period of use for promoting a catalytic reaction at a selected reaction temperature in an atmosphere inert thereto, to a temperature substantially higher than said reaction temperature but lower than the temperature at which deterioration thereof occurs at an excessive rate, replacing said atmosphere by a second atmosphere inert to said catalyst and comprising chiefly at least one rare-gas element, and maintaining said catalyst in said second atmosphere substantially to the moment at which the catalyst is placed into use for promoting said reaction.

13. The process according to claim 7, in which the atmosphere has a pressure of less than about 0.1 mm. of mercury.

14. The process according to claim 7, in which the atmosphere consists chiefly of at least one rare-gas element.

15. The process according to claim 3, in which the catalyst is cooled and placed into use within a time of about 15 minutes.

16. A process for extending the useful duration of an operating period of a catalytic conversion operation using a contact catalyst comprising black unglowed chromium oxide within a selected operating temperature range below 600° C., which comprises interrupting the conversion operation when the conversion decreases to an undesirable low value, replacing the reaction mixture with an atmosphere which is inert to said catalyst, heating said catalyst to a temperature below 800° C., and at least 50° C. above said operating temperature for a period of time sufficient to increase its activity and establish a state of dynamization in said catalyst, cooling said catalyst at a sufficiently rapid rate to maintain said state of dynamization, and resuming said conversion operation.

17. A process for extending the useful duration of an operating period of a catalytic hydrocarbon dehydrogenation operation using a dehydrogenation catalyst comprising black unglowed chromium oxide within a dehydrogenation temperature range, which comprises interrupting said dehydrogenation when the dehydrogenation activity has decreased to an undesirable low value, replacing the reaction mixture with an atmosphere which is inert to said catalyst, heating said catalyst to a temperature below about 800° C., and at least 50° C. above said operating temperature for a period of time such that said catalyst has an activity higher than said decreased activity and a state of dynamization is established in said catalyst, cooling said catalyst to a desirable dehydrogenation temperature at a sufficiently rapid rate to maintain said state of dynamization, and resuming said dehydrogenation.

18. A process of treating a contact catalyst capable of promoting a catalytic reaction at an operating temperature substantially below 800° C. and which displays an induction period at the beginning of a period of use for promoting said catalytic reaction, said catalyst being otherwise ready for use in said catalytic reaction, which comprises heating said catalyst prior to such a period of use in an atmosphere inert thereto, to a temperature sufficiently above said operating temperature to produce a state of dynamization therein but below the temperature at which excessive deterioration thereof occurs, and bringing the thus heated catalyst to said operating temperature under such conditions of atmosphere and rate of cooling that said state of dynamization is substantially maintained.

19. A process for the conversion of a hydrocarbon fraction in the presence of a contact catalyst which displays an induction period prior to each period of use, which consists of converting a hydrocarbon fraction by passing said fraction in vapor phase over such a solid contact catalyst under conversion conditions of temperature and pressure, interrupting said conversion when the activity of said catalyst decreases to an undesirably low value, replacing the hydrocarbon fraction with a nonoxidizing atmosphere inert to said catalyst, heating said catalyst to a temperature at least 50° C. above the operating temperature but below the temperature at which excessive deterioration occurs for a period of time sufficient to increase its activity and establish a state of dynamization in said catalyst while maintaining said catalyst in said atmosphere, cooling said catalyst at a sufficiently rapid rate to maintain said state of dynamization and resuming said conversion.

20. The process of claim 19, in which the inert atmosphere comprises chiefly hydrogen.

21. The process of claim 19, in which the contact catalyst comprises black unglowed chromium oxide.

22. In a process for eliminating the induction period exhibited by a contact catalyst comprising black unglowed chromium oxide, in which process said catalyst is heated to an elevated temperature at least 50° C. above a subsequent conversion temperature, said catalyst previous to the heating being otherwise ready for use in a conversion, the step which comprises cooling said heated catalyst from said elevated temperature to said subsequent conversion temperature in an atmosphere inert to said catalyst and establishing said catalyst in use in said catalytic conversion, said cooling and said establishing being effected within a relatively short period of time shorter than that after which said catalyst would otherwise exhibit a substantial induction period.

MARYAN P. MATUSZAK.